United States Patent
Lee et al.

(10) Patent No.: US 8,447,104 B2
(45) Date of Patent: May 21, 2013

(54) METHOD, MEDIUM AND SYSTEM ADJUSTING PREDICTED VALUES BASED ON SIMILARITIES BETWEEN COLOR VALUES FOR IMAGE COMPRESSING/RECOVERING

(75) Inventors: Sang-jo Lee, Suwon-si (KR); Si-hwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1066 days.

(21) Appl. No.: 12/076,549

(22) Filed: Mar. 19, 2008

(65) Prior Publication Data

US 2009/0074290 A1    Mar. 19, 2009

(30) Foreign Application Priority Data

Sep. 14, 2007 (KR) .................... 10-2007-0093848

(51) Int. Cl.
   *G06K 9/00* (2006.01)
(52) U.S. Cl.
   USPC ............ 382/167; 382/166; 382/238; 358/518
(58) Field of Classification Search
   USPC .................. 382/166, 167, 232, 238; 358/518
   See application file for complete search history.

(56) References Cited

U.S. PATENT DOCUMENTS

| | | | | |
|---|---|---|---|---|
| 5,297,220 | A | * | 3/1994 | Nomizu ........................ 382/247 |
| 6,122,317 | A | * | 9/2000 | Hanami et al. ........... 375/240.16 |
| 6,744,929 | B1 | * | 6/2004 | Okada .......................... 382/251 |
| 2005/0089219 | A1 | * | 4/2005 | Zhang .......................... 382/167 |

FOREIGN PATENT DOCUMENTS

| | | |
|---|---|---|
| EP | 1 478 189 A2 | 11/2004 |
| JP | 04-077500 | 3/1992 |
| JP | 09-186882 | 7/1997 |
| JP | 2005-286415 | 10/2005 |
| JP | 2006-121302 | 5/2006 |
| KR | 10-2004-0028489 | 4/2004 |
| KR | 10-2005-0009216 | 1/2005 |
| KR | 10-2005-0009226 | 1/2005 |
| KR | 10-2007-0009336 | 1/2007 |
| KR | 10-2007-0009337 | 1/2007 |

OTHER PUBLICATIONS

Japanese Office Action mailed Nov. 9, 2010, corresponds to Japanese Patent Application No. 2008-233970.
Kobayashi M. et al: "Lossless Compression for RGB Color Still Images", Image Processing, 1999. ICIP 99. Proceedings. 1999 International Conference On-Kobe, Japan, Oct. 24-28, 1999, IEEE, Piscataway, N.J. USA, vol. 4, pp. 73-77.

(Continued)

*Primary Examiner* — Chan S Park
*Assistant Examiner* — Eueng-Nan Yeh
(74) *Attorney, Agent, or Firm* — Staas & Halsey LLP

(57) ABSTRACT

A method, medium, and system compressing an image, and a method, medium, and system recovering an image. Values of colors of a pixel from among pixels making up an image are predicted from values of colors of a reference pixel corresponding to the pixel, and the predicted values of the colors of the pixel are corrected based on similarities in variations in color values in the image.

32 Claims, 9 Drawing Sheets

OTHER PUBLICATIONS

Benierbah S. et al: "Lossless Color and Multispectral Images Coding with Inter-Band Compensated Prediction", Control, Communications and Signal Processing, 2004. First International AI Symposium on Hammamet, Tunisia, Mar. 21-24, 2004, Piscataway, N.J. USA, IEEE, pp. 427-430.

Marcelo J. Weinberger et al., "The LOCO-I Lossless Image Compression Algorithm: Principles and Standardization into JPEG-LS", IEEE Transactions on Image Processing, IEEE Service Center, Piscataway, N.J. US, vol. 9, No. 8, Aug. 1, 2000.

Doutre C. et al., "An Efficient Compression Scheme for Colour Filter Array Images Using Estimated Colour Differences", Electrical and Computer Engineering, 2007. CCECE 2007. Canadian Conference on, IEEE, PI, Apr. 1, 2007, pp. 24-27.

European Extended Search report issued Jun. 20, 2012 corresponds to European Application No. 08164273.8-2223/2046052.

* cited by examiner

METHOD, MEDIUM AND SYSTEM ADJUSTING PREDICTED VALUES BASED ON SIMILARITIES BETWEEN COLOR VALUES FOR IMAGE COMPRESSING/RECOVERING

CROSS-REFERENCE TO RELATED APPLICATIONS

This application claims the benefit of Korean Patent Application No. 10-2007-0093848, filed on Sep. 14, 2007, in the Korean Intellectual Property Office, the disclosure of which is incorporated herein in its entirety by reference.

BACKGROUND

1. Field

One or more embodiments of the present invention relate to a method, medium, and system for correcting predicted values of pixels making up an image and, more particularly, to a method, medium, and system compressing and recovering an image using such prediction value correction.

2. Description of the Related Art

Conventional image compression techniques include compressing an image using spatial similarities within the image. Standards for this type of spatial similarity based image compression include JPEG (Joint Photographic Expert Group), JPEG 2000, and JPEG LS, for example.

FIG. 1 illustrates such a conventional image compressing system. Referring to FIG. 1, the image compressing system includes a subtracter 11, an encoder 12, a recovering unit 13 and a prediction unit 14. The subtracter 11 subtracts a predicted value of a currently processed pixel, from among pixels making up an image, from an input actual value of the pixel to obtain a difference between the actual value and the predicted value of the pixel. Then the encoder 12 encodes the difference between the actual value and the predicted value of the pixel. Subsequently, the recovering unit 13 decodes the encoded result to recover the difference between the actual value and the predicted value of the pixel, and adds the recovered difference to values of colors of a reference pixel for the pixel to generate a recovery value of the pixel. The prediction unit 14 then predicts a value for the pixel from the value of the reference pixel corresponding to the pixel, from among pixels making up an image, as recovered by the recovering unit 13.

As the difference between the actual value of a pixel making up an image and a predicted value of the pixel, that is, an error of the predicted value, approximates zero, image compression rates increase. Accordingly, a technique is desired for predicting values of pixels making up an image such that the predicted values closely approximate the actual values of the pixels for improving image compression rates. For example, in JPEG-LS, a technique of correcting predicted values of pixels forming an image based on context in the image was proposed in order to more correctly predict the values of the pixels. This technique is based on the assumption that the accuracy of prediction for the value of a pixel belonging to a past context in the image is similar to the accuracy of prediction for the value of a pixel belonging to a current context identical or similar to the past context. For example, when an error of a predicted value of a pixel of a past context similar or identical to the context for a current pixel is +10, the accuracy of prediction for values of colors of the current pixel can be improved by adding a corresponding predetermined positive number to a predicted value of the current pixel.

FIG. 2 illustrates such a conventional JPEG-LS image compressing system. Referring to FIG. 2, the conventional JPEG-LS image compressing system includes a subtracter 21, an encoder 22, a recovering unit 23, a prediction unit 24, and a context-based correction unit 25. The components of the image compressing system correspond to the components of the image compressing system illustrated in FIG. 1 except for the addition of the context-based correction unit 25.

In such a JPEG-LS technique, a single context can be defined as a combination of a difference D1 between recovered values of colors of a pixel located along the top and to the left of a certain pixel and recovered values of colors of a pixel located left of the certain pixel, a difference D2 between recovered values of colors of a pixel located along the top of the certain pixel and recovered values of colors of a pixel located along the top and left of the certain pixel, and a difference D3 between recovered values of colors of a pixel located along the top and right of the certain pixel and recovered values of colors of a pixel along the top of the certain pixel. Furthermore, in JPEG-LS, the differences D1, D2 and D3 are quantized to nine values and a quantization value Q whose first non-zero component is a negative number is represented as −Q so as to produce (729/2)+1, that is, 365, contexts.

When errors of predicted values of colors of pixels making up an image are calculated, the context-based correction unit 25 accumulates a currently calculated error to the context for a pixel from among the 365 contexts and calculates an average of accumulated errors. The average of accumulated errors corresponds to an error of the context of the pixel. This operation is accumulatively performed from an initially processed pixel from among the pixels making up the image to the currently processed pixel. Furthermore, based on such contexts, the context-based correction unit 25 corrects predicted values of colors of a pixel, generated by the prediction unit 24, based on errors of predicted values of colors of a pixel represented by a context identical or similar to the context of the pixel from among previously accumulated contexts of multiple pixels in the image.

SUMMARY

One or more embodiments of the present invention include a method, medium, and system approximating to zero a difference between an actual value and a predicted value of each of the pixels making up an image for improving image compression rates.

One or more embodiments of the present invention correspondingly include a method, medium, and system compressing and/or recovering an image.

Additional aspects and/or advantages will be set forth in part in the description which follows and, in part, will be apparent from the description, or may be learned by practice of the invention.

To achieve the above and/or other aspects and advantages, one or more embodiments of the present invention may include a method adjusting predicted values for an input pixel for image compression, the method including predicting values of colors for the pixel for compressing the pixel, from among pixels making up an image for the image compression, based on values of colors of a reference pixel corresponding to the pixel, and selectively modifying the predicted values of the colors for the pixel based on similarities in variations between values of colors in the image.

To achieve the above and/or other aspects and advantages, one or more embodiments of the present invention may include a system modifying a predicted value for an input pixel for image compression, the system including a prediction unit predicting values of colors for the pixel for compressing the pixel, from among pixels making up an image for the image compression, based on values of colors of a reference pixel corresponding to the pixel, and a correction unit to selectively modify the predicted values of the colors for the pixel based on similarities in variations between values of colors in the image.

To achieve the above and/or other aspects and advantages, one or more embodiments of the present invention may include an image compressing method, including predicting values of colors for compressing a pixel, from among pixels making up an image, based on values of colors of a reference pixel corresponding to the pixel, selectively modifying the predicted values of the colors for the pixel based on similarities in variations between values of colors in the image, generating differences between input values of colors of the pixel and the selectively modified predicted values for the colors of the pixel, and encoding the generated differences.

To achieve the above and/or other aspects and advantages, one or more embodiments of the present invention may include an image recovering method, including recovering from compressed image data differences between actual values of colors of a pixel and predicted values of the colors for the pixel, from among pixels making up a corresponding image, predicting values of the colors of the pixel based on values of colors of a reference pixel corresponding to the pixel, selectively modifying the predicted values of the colors for the pixel based on similarities in variations between values of colors in the image, and summing the recovered differences with the selectively modified predicted values and generating recovered values of the colors of the pixel based on a result of the summing.

To achieve the above and/or other aspects and advantages, one or more embodiments of the present invention may include a compression system, including a correction unit to selectively color modify predicted values for input image data based on similarities in variations between values of colors in the image data, and an encoder to encode a difference between the input image data and predicted image data for respective normative color image data and a difference between the input image data and the modified predicted values for respective non-normative color image data, with at least one pixel of the input image data having a non-zero normative color value and a non-zero non-normative color value.

To achieve the above and/or other aspects and advantages, one or more embodiments of the present invention may include an image recovering system, including a recovering unit to recover encoded differences between an original input image data and corresponding predicted image data used in compressing the input image, and a correction unit to selectively color modify predicted values, from predicted values derived for all colors of the image data to recover the input image, for non-normative color image data for the image data based on similarities in variations between values of colors in the image data, wherein the corresponding predicted image data used in the compressing of the input image includes predicted image data used in the compressing of the input image for respective normative color image data and modified predicted data used in the compressing of the input image for respective non-normative color image data, with at least one pixel of the input image data having a non-zero normative color value and a non-zero non-normative color value.

To achieve the above and/or other aspects and advantages, one or more embodiments of the present invention may include a compression system, including a context-based correction unit to perform context-based modification of predicted values of input image data to generate context corrected predicted values for the input image, a correction unit to selectively color modify the context corrected predicted values for the input image data based on similarities in variations between values of colors in the image data to generate color modified predicted values, and an encoder to encode a difference between the input image data and the context corrected predicted values for respective normative color image data and a difference between the input image data and the color modified predicted values for respective non-normative color image data, with at least one pixel of the input image data having a non-zero normative color value and a non-zero non-normative color value.

To achieve the above and/or other aspects and advantages, one or more embodiments of the present invention may include a compression system, including a correction unit to selectively color modify predicted values for input image data based on similarities in variations between values of colors in the image data to generate color modified predicted values, a context-based correction unit to perform context-based modification of the color modified predicted values for non-normative color image data for the input image data and context-based modification of the predicted values for respective normative color image data, with at least one pixel of the input image data having a non-zero normative color value and a non-zero non-normative color value, to generate context corrected predicted values for the input image, and an encoder to encode a difference between the input image data and the context corrected predicted values for respective normative color image data and non-normative color image data.

To achieve the above and/or other aspects and advantages, one or more embodiments of the present invention may include a compression method, including selectively color modifying predicted values for input image data based on similarities in variations between values of colors in the image data, and encoding a difference between the input image data and predicted image data for respective normative color image data and a difference between the input image data and the modified predicted values for respective non-normative color image data, with at least one pixel of the input image data having a non-zero normative color value and a non-zero non-normative color value.

To achieve the above and/or other aspects and advantages, one or more embodiments of the present invention may include an image recovering method, including recovering encoded differences between an original input image data and corresponding predicted image data used in compressing the input image, and selectively color modifying predicted values, from predicted values derived for all colors of the image data to recover the input image, for non-normative color image data for the image data based on similarities in variations between values of colors in the image data, wherein the corresponding predicted image data used in the compressing of the input image includes predicted image data used in the compressing of the input image for respective normative color image data and modified predicted data used in the compressing of the input image for respective non-normative color image data, with at least one pixel of the input image data having a non-zero normative color value and a non-zero non-normative color value.

To achieve the above and/or other aspects and advantages, one or more embodiments of the present invention may include a compression method, including context-based modifying predicted values of input image data to generate context corrected predicted values for the input image, selectively color modifying the context corrected predicted values for the input image data based on similarities in variations between values of colors in the image data to generate color modified predicted values, and encoding a difference between the input image data and the context corrected predicted values for respective normative color image data and a difference between the input image data and the color modified predicted values for respective non-normative color image data, with at least one pixel of the input image data having a non-zero normative color value and a non-zero non-normative color value.

To achieve the above and/or other aspects and advantages, one or more embodiments of the present invention may include a compression method, including selectively color modifying predicted values for input image data based on similarities in variations between values of colors in the image data to generate color modified predicted values, context-based modifying the color modified predicted values for non-normative color image data for the input image data and context-based modification of the predicted values for respective normative color image data, with at least one pixel of the input image data having a non-zero normative color value and a non-zero non-normative color value, to generate context corrected predicted values for the input image, and encoding a difference between the input image data and the context corrected predicted values for respective normative color image data and non-normative color image data.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
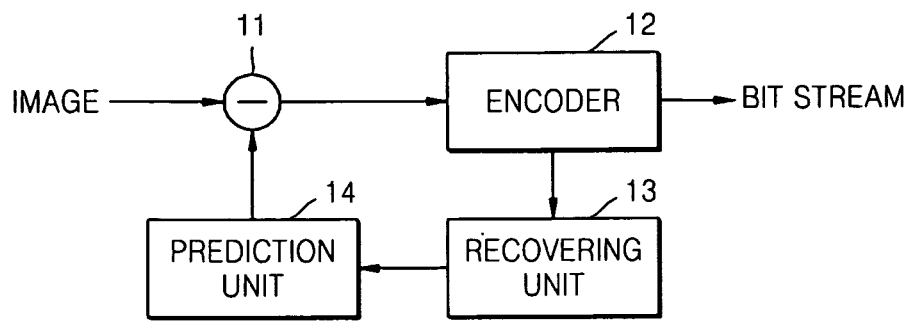
FIG. 1 illustrates a conventional image compressing system.
Figure 2:
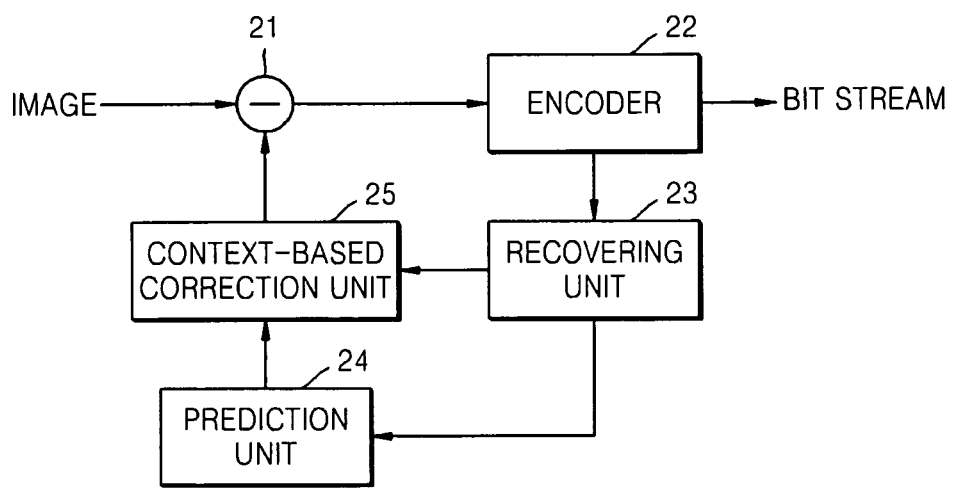
FIG. 2 illustrates a conventional JPEG-LS image compressing system.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 3:
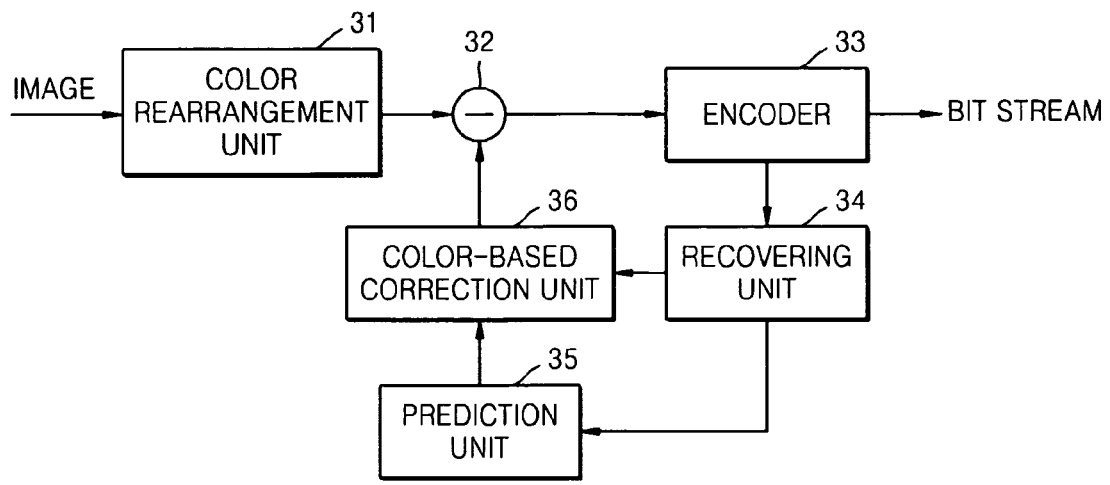
FIG. 3 illustrates an image compressing system, according to an embodiment of the present invention.

FIG. 3 illustrates an image compressing system, according to an embodiment of the present invention. Referring to FIG. 3, the image compressing system may include a color rearrangement unit 31, a subtracter 32, an encoder 33, a recovering unit 34, a prediction unit 35, and a color-based correction unit 36, for example. Although only one of the pixels making up an image is discussed as being compressed in embodiments of the present invention, it should be understood by those of ordinary skill in the art that embodiments of present invention can be equally applied to one or more respective pixels making up the image.

The subtracter 32 subtracts predicted values of colors of a currently processed pixel, from among pixels making up an image, which are generated by the prediction unit 35 or corrected by the color-based correction unit 36, from input actual values of the colors of the pixel to obtain differences between the actual values and the predicted values of the colors of the pixel. The differences between the actual values and predicted values of the colors of the pixel can be referred to as errors of the predicted values of the colors of the pixel.

The encoder 33 may encode the differences between the actual values and predicted values of the colors of the pixel and generate a bit stream including the encoding result. Specifically, the encoder 33 may encode differences between the actual values and predicted values of the colors of the pixel by using a lossy compression technique, for example, and then encode the lossy compression result by using a lossless compression technique, also for example. Here, the lossy compression technique may include a discrete cosine transform (DCT) and quantization and the lossless compression technique may include entropy encoding, noting that alternatives are equally available. In this regard, in the above embodiment example, it should be understood by those of ordinary skill in the art that the encoder 33 may encode the differences between the actual values and predicted values of the colors of the pixel by using only one of the lossy compression technique and the lossless compression technique, for example, the lossless compression technique.

The recovering unit 34 may decode an encoding result of the encoder 33 to recover such differences between the actual values and predicted values of the colors of the pixel and add the differences to recovered values of colors of a reference pixel corresponding to the pixel to generate recovered values of the colors of the pixel. In general, in an embodiment, the recovering unit 34 decodes the encoding result of the encoder 33 by using a lossy compression technique, e.g., through an inverse quantization or inverse discrete cosine transform (IDCT). Here, the recovering unit 34 may recover the same image as an image obtained by a decoding of the encoding result of the encoder by a separate image recovering system, i.e., a decoder, that received the corresponding encoded bit stream.

The prediction unit 35 further predicts values of the colors for the pixel from the recovered values of the colors of the reference pixel corresponding to the pixel. The recovered values of the colors of the reference pixel corresponding to the pixel can correspond to recovered values of colors of a pixel closest to the pixel, an average value of recovered values of colors of multiple neighboring pixels of the pixel or recovered values of colors of pixels located in a specific direction from the pixel. It should be understood by those of ordinary skill in the art that the recovered values of the colors of the reference pixel corresponding to the pixel can equally be derived by various techniques other than the aforementioned techniques.

The color-based correction unit 36 may further correct/modify the predicted values of the colors of the pixel, e.g., generated by the prediction unit 35, based on the similarities in variations between colors of pixels in the image. Specifically, the color-based correction unit 36 may correct the predicted values for colors, among the colors of the pixel, other than a normative color, also among the colors of the pixel, based on a difference between an actual value and the predicted value of the normative color, that is, an error of the predicted value of the normative color. In an embodiment, the normative color may be the color green (G), for example, when all colors of the pixels making up the image include of red, green and blue colors. However, here, it should be understood that the colors of the pixels can include other/different colors and the normative color may be a color other than the color green. Since such a predicted value correction is not performed on the color green, e.g., as the normative color, and is carried out only on the remaining red and blue colors, as the non-normative colors, the subtracter 32 may subtract the predicted values of the red and blue colors, corrected by the color-based correction unit 36, from the actual input values of the colors of the pixel and subtract the predicted value of the color green, e.g., as the normative color and generated by the prediction unit 35, from the input actual value of the corresponding green color of the pixel.

In general, variations between values of colors of pixels in an image can be classified into a variation in the luminance of a part of the image and a variation in the chromaticity in the part of the image. When the luminance of a part of an image varies, values of colors of pixels corresponding to that part, for example, values of red, green and blue colors, typically change almost evenly/equally. When the chromaticity of that part of the image varies, the values of the colors of the pixels corresponding to that part, e.g., values of red, green and blue colors, change differently. The equal changing typically corresponds to variations in color values of pixels corresponding to an object or a background of an image and the different changing typically corresponds to variations in color values of pixels corresponding to a boundary of objects in an image.

Since color values of neighboring pixels are typically continuous because of the characteristic of images, if color values of pixels corresponding to a luminance-varying part of an image are changed in a manner that the chromaticity of only a specific pixel is changed, that change of the color values can typically be considered an error due to various causes, including accumulation of prediction errors of a specific color value, for example. Accordingly, in one or more embodiments predicted values of colors of a pixel may be corrected based on the similarities in variations in color values of pixels in an image, and more specifically, predicted values of colors other than the normative color, from among the colors of the pixel including the normative color, may be corrected based on an error of a predicted value of the normative color.

Furthermore, correlation of variations in values of colors other than the normative color with respect to a variation in a value of the normative color is typically very high when the luminance of a part of an image changes and the correlation is typically low when the chromaticity of the part of the image change. Accordingly, one or more embodiments of the present invention corrects/modifies predicted values of the colors other than the normative color in consideration of correlation of variations in the values of the colors other than the normative color with respect to a variation in the value of the normative color.

Figure 4:
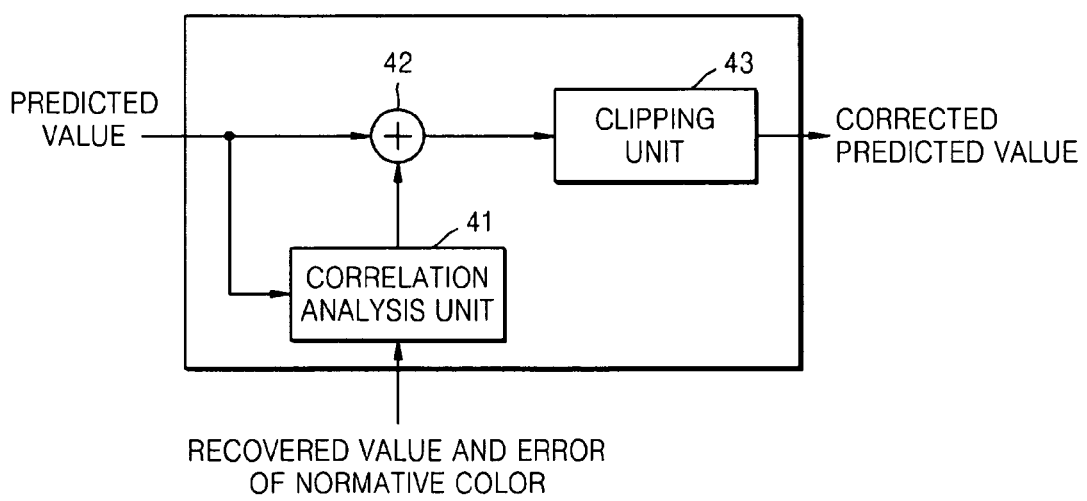
FIG. 4 illustrates a color-based correction unit of an image compressing system, such as that illustrated in FIG. 3, according to an embodiment of the present invention.

FIG. 4 illustrates a color-based correction unit, such as the color-based correction unit 36 of the image compressing system illustrated in FIG. 3, according to an embodiment of the present invention. Referring to FIG. 4, the color-based correction unit may include a correlation analysis unit 41, a summer 42, and a clipping unit 43, for example.

The correlation analysis unit 41 may calculate an offset that represents correlation of variations in values of colors other than the normative color, from among the colors of the pixel, with respect to a variation in the value of the normative color. Specifically, the correlation analysis unit 41 may reflect differences between the recovered value of the normative color of the pixel, generated by the recovering unit 34, and the predicted values of other colors, generated by the prediction unit 35, in a difference between the actual value and the predicted value of the normative color, that is, an error of the predicted value of the normative color, to calculate offsets for the other colors according to the below Equation 1, for example.

$$\text{Offset} = \text{Error}_{ref} \times [\{256 - ABS(\text{Color\_value}_{ref} - \text{Predicted\_value})\}/256] \quad \text{Equation 1}$$

Thus, in this embodiment, the correlation analysis unit 41 may calculate the absolute value of a difference between the recovered value of the normative color of the pixel and the predicted value of each of colors other than the normative color, subtract the absolute value from 256, divide the subtraction result by 256, and multiply the error of the predicted value of the normative color by the division result to obtain the offset, according to Equation 1. Briefly, here it is noted that Equation 1 includes "256" based on an assumption that each of color values is represented in 8 bits, noting that alternatives are equally available.

It can be derived from Equation 1, for example, that offsets calculated by the correlation analysis unit 41 approximate the error of the predicted value of green color corresponding to the normative color as differences between the recovered value of the green color and the predicted values of red and blue colors decrease, and the offset approximates zero as the differences increase.

The summer 42 may thus sum up the predicted values of other colors, e.g., as generated by the prediction unit 35, and offset calculated by the correlation analysis unit 41, for example, so as correct the predicted values of other colors.

Since red, green and blue color values typically vary in a similar manner in a luminance-varying region of an image, the variation in the difference between a recovered value of a green color corresponding to the normative color and a predicted value of the green color may almost be identical to a variation in the difference between the recovered value of the green color and a predicted value of a red color and a variation in the difference between a green color value and a blue color value. Accordingly, if a variation in the difference between the recovered value of the green color and a predicted value of a color other than the green color is remarkably different from a variation in the difference between the recovered value of the green color and the predicted value of the green color in the luminance-varying region, there is a high possibility that the predicted value of the other color is an error. Therefore, in an embodiment, differences between the recovered value of the normative color of the pixel and predicted values of other colors may be reflected as an error of the predicted value of the normative color and the result of the reflection added to the predicted values of other colors such that variations values of colors other than the normative color become similar to a variation in the normative color value in the luminance-varying region.

In an embodiment, the clipping unit 43 may further clip portions of bit streams of predicted values, e.g., corrected by the summer 42, according to a bit stream length of pixels making up an image. If color values of a pixel respectively include 8 bits, for example, the bit streams of the predicted values corrected by the summer 42 may be required to be adjusted to values belonging to 0 through 255. In such a case, when the predicted values corrected by the summer 42 exceed 255, the clipping unit 43 clips an 8-bit excess part starting from the least significant bit (LSB) of the bit stream of each of the corrected predicted values. If color values of a pixel respectively include 8 bits, the bit streams of the predicted values corrected by the summer 42 may further desirably be adjusted to values belonging to 0 through 1023. In this case, when the predicted values corrected by the summer 42 exceed 1023, the clipping unit 43 may clips a 10-bit excess part starting from the LSB of the bit stream, for example, of each of the corrected predicted values.

As described above, the recovered values of the colors of the pixel may be generated by summing up the predicted values of the colors of the pixel and errors of the predicted values of the colors of the pixel. Accordingly, if color values of all the pixels making up an image are not completely independently recovered, that is, if color values are simultaneously recovered pixel by pixel, a recovered value of a normative color of a certain pixel cannot be generated before values of other colors of that certain pixel are recovered. To solve this problem, the image compressing system may include the color rearrangement unit 31 illustrated in FIG. 3.

Figure 5:
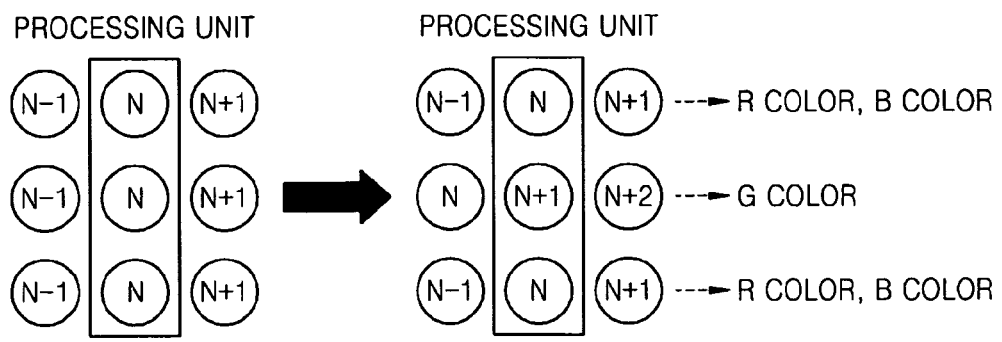
FIG. 5 illustrates color rearrangement according to a color rearrangement unit, such as the color rearrangement unit 31 of the image compressing system illustrated in FIG. 3, according to an embodiment of the present invention.

In an embodiment, the color rearrangement unit 31 may move forward the position of a value of a normative color from among colors of each of pixels making up an image by one pixel from the position of a pixel to which the normative color value currently belongs in terms of a pixel processing order. FIG. 5 illustrates a color rearrangement, e.g., by the color rearrangement unit 31 of the image compressing system illustrated in FIG. 3. Referring to FIG. 5, the position of a value of green color, of each of pixels making up an image, may be advanced by one pixel from the positions of corresponding red and blue color values of the same pixel. That is, the position of the green color value is advanced to the position of a pixel processed right before the pixel to which the green color value belongs and the positions of red and blue color values are maintained at their respective positions on an assumption that color values are simultaneously recovered pixel by pixel. Accordingly, in an embodiment, if color values of all the pixels making up an image are completely independently recovered, the color rearrangement unit 31 may not be required.

Thus, depending on embodiment, the subtracter 32, the encoder 33, the recovering unit 34, the prediction unit 35, and the color-based correction unit 36 may perform processing of normative color values of pixels making up an image prior to processing of other color values by one pixel according to the movement of the positions of the normative color values, carried out by such a color rearrangement unit 31. Consequently, the recovering unit 34 may generate a recovered value of a normative color of a pixel making up the image prior to generating recovered values of other colors of the pixel according to the movement of the positions of the normative color value by the color rearrangement unit 31, and thereafter the color-based correction unit 36 may correct predicted values of other colors using the previously generated recovered values of the normative colors.

Figure 6:
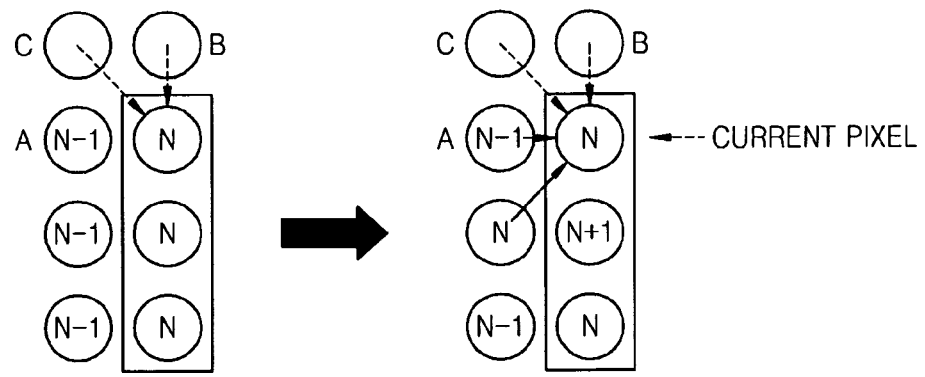
FIG. 6 illustrates generation of predicted values of colors after color rearrangement, such as the color rearrangement illustrated in FIG. 5, according to an embodiment of the present invention.

FIG. 6 similarly illustrates the generation of predicted values of colors after the color rearrangement illustrated in FIG. 5. The left portion of FIG. 6 illustrates the generation of predicted values of colors according to JPEG-LS. Referring to the left portion of FIG. 6, the prediction unit 35 illustrated in FIG. 3 may predict values of colors of a pixel from values of colors of a pixel A located to the left of the pixel, a pixel B located at the top of the pixel and a pixel C located at the top and to the left of the pixel according to the following example algorithm defined by JPEG-LS.

If (c ≧ max(a, b)) then p = min(a, b);
else
{if (c ≦ min(a, b)) then p = max(a, b);
else p = a + b − c;}

Here, a, b and c respectively denote the color values of the pixels A, B, and C, max(a, b) represents a larger value of a and b, min(a, b) represents a smaller value of a and b, and p is a value of one of colors of a reference pixel.

According to this example algorithm, a reference pixel value may be determined according to which direction an edge is distributed among the pixel and the neighboring pixels A, B and C. Here, the edge can be considered a boundary at which color values abruptly vary in an image. The prediction unit 35 illustrated in FIG. 3, for example, may judge that a horizontal edge exists among the pixel and the neighboring pixels A, B and C if min(a, b)=a when c≧max(a, b) and determine the reference pixel value p to be a. Furthermore, the prediction unit 35 illustrated in FIG. 3 may judge that a vertical edge exists among the pixel and the neighboring pixels A, B and C if min(a, b)=b when c≧max(a, b) and determines the reference pixel value p to be b. The prediction unit 35 illustrated in FIG. 3 may also judge that a horizontal edge exists among the pixel and the neighboring pixels A, B and C if max(a, b)=a when c≦min(a, b) and determines the reference pixel value p to be a. The prediction unit 35 illustrated in FIG. 3 may judge that a vertical edge exists among the pixel and the neighboring pixels A, B and C if max(a, b)=b when c≦min(a, b) and determines the reference pixel value p to be b. Still further, the prediction unit 35 illustrated in FIG. 3 may determine the reference pixel value p as a+b−c when min(a, b)<c<max(a, b) because it is difficult to judge that a vertical or horizontal edge exists among the pixel and the neighboring pixels A, B and C.

It should be understood by those of ordinary skill in the art that color values of the reference pixel corresponding to a pixel may be determined by using various alternate techniques, other than the above.

The right portion of FIG. 6 illustrates the generation of predicted values, according to an embodiment of the present invention. Referring to the right portion of FIG. 6, the color-based correction unit 36 may correct predicted values of red and blue colors based on variations in the predicted values of the red and blue colors, generated by the prediction unit 35, according to the aforementioned algorithm, on the basis of a green color value corresponding to a normative color value of a pixel located at the bottom and to the left of the pixel.

Figure 7:
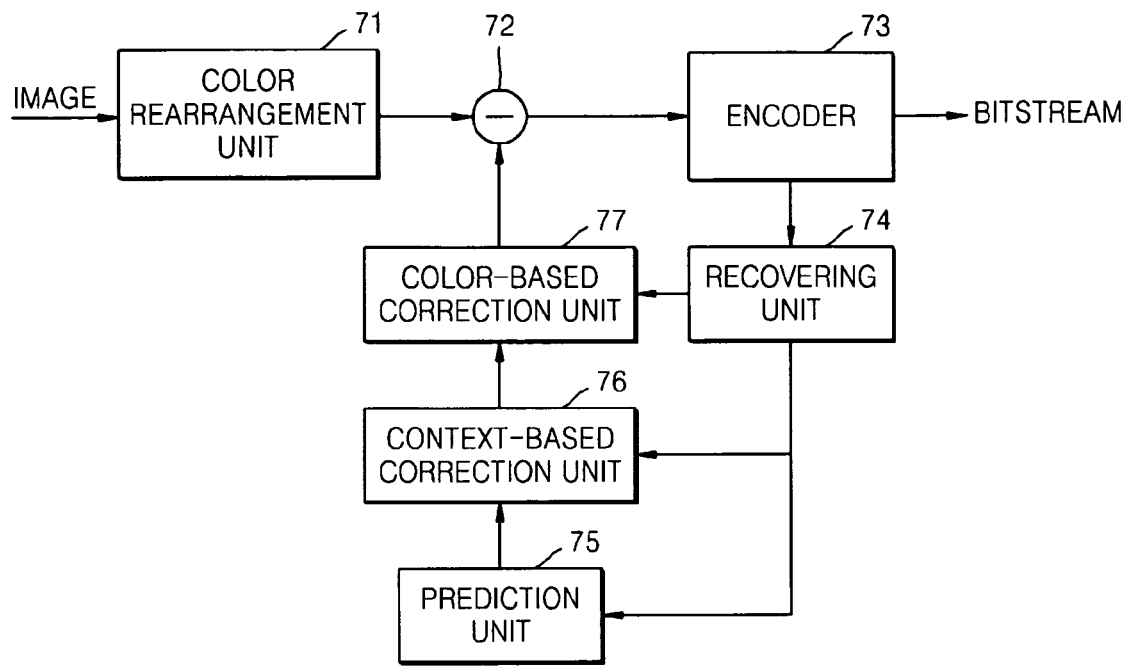
FIG. 7 illustrates an image compressing system, according to another embodiment of the present invention.

FIG. 7 illustrates a configuration of an image compressing system, according to an embodiment of the present invention. Referring to FIG. 7, the image compressing system may include a color rearrangement unit 71, a subtracter 72, an encoder 73, a recovering unit 74, a prediction unit 75, a context-based correction unit 76, and a color-based correction unit 77, for example. The illustrated "context-based prediction value correction" is independent of the illustrated "color-based prediction value correction", and the two correction techniques may be simultaneously used, for example. Components of the image compressing system illustrated in FIG. 7 may be similar to those of the image compressing system illustrated in FIG. 3, for example, except for the shown context-based correction unit 76.

Here, the context-based correction unit 76 may correct predicted values of colors of a pixel, e.g., generated by the prediction unit 75, based on errors of predicted values of colors of a pixel represented by a context identical or most similar to a context of the pixel from among previously accumulated contexts of a plurality of pixels in an image.

The color-based correction unit 77 may further correct the predicted values, e.g., corrected by the context-based correction unit, based on similarities in variations in color values of pixels in the image. However, it should be understood by those of ordinary skill in the art that the operation of the color-based correction unit 77 may also be performed and then the operation of the context-based correction unit 76 carried out. That is, with such a swap, FIG. 7 should be interpreted as alternatively showing a context-based correction unit, replacing the illustrated color-based correction unit 77, correcting predicted values corrected by a color-based correction unit, replacing the illustrated context-based correction unit 76, for example.

Figure 8:
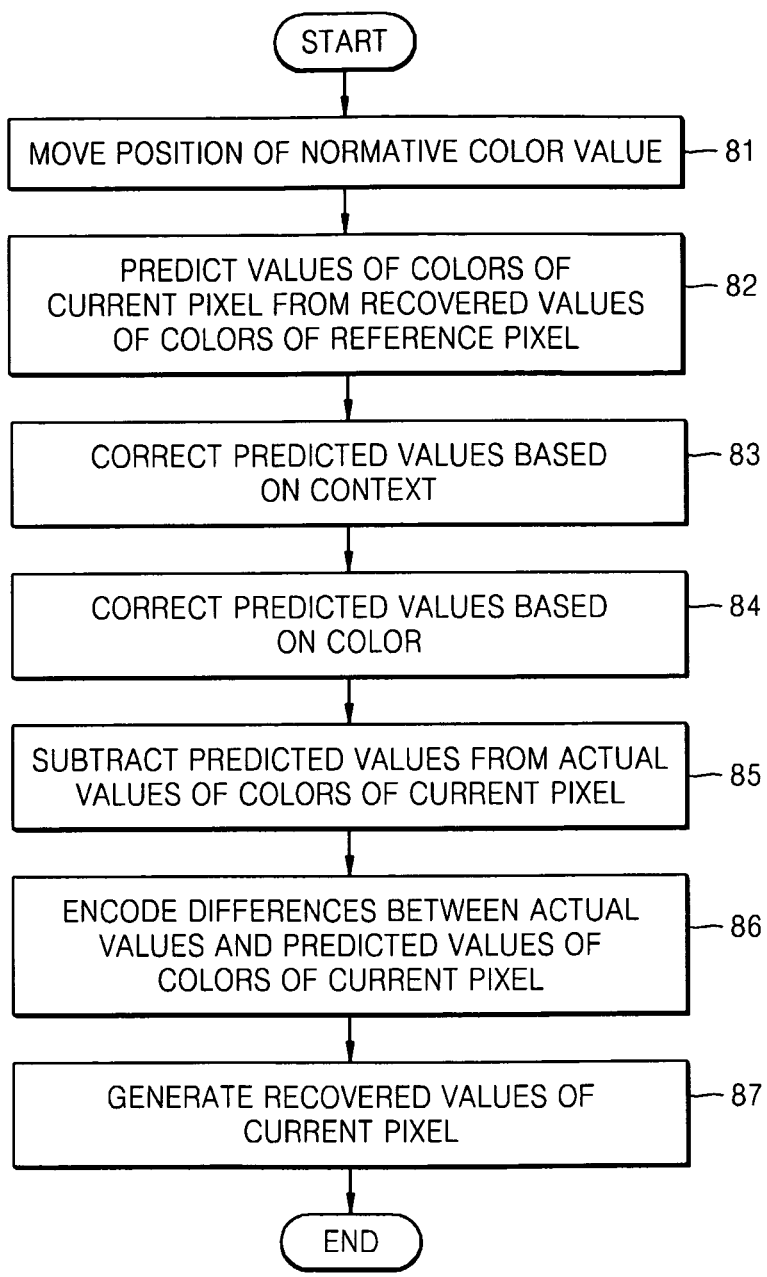
FIG. 8 illustrates an image compressing method, according to an embodiment of the present invention.

FIG. 8 illustrates an image compressing method, according to an embodiment of the present invention. As only one example, such an embodiment may correspond to example operations of the example system illustrated in FIG. 3, but is not limited thereto and alternate embodiments are equally available.

The position of a value of a normative color of each of pixels making up an image may be moved forward by one pixel from the position of a pixel to which the normative color value currently belongs in terms of a pixel processing order, in operation 81. As described above, depending on embodiment, such an operation 81 may be omitted.

Values of colors of a pixel may be predicted from recovered values of colors of a reference pixel corresponding to the pixel, from among pixels making up a recovered image, in operation 82. The recovered image may correspond to an image made up of pixels processed and recovered, according to the embodiment of the present invention, prior to the pixel, for example.

The predicted values of the colors of the pixel, such as generated in operation 82, may further be predicted based on errors of predicted values of colors of a pixel represented by a context identical or most similar to a context of the pixel, from among previously accumulated contexts of a plurality of pixels in the image. As described above, depending on embodiment, operation 83 may be omitted.

The predicted values of the colors of the pixel, e.g., as corrected in operation 83, may be corrected based on similarities in variations in color values of pixels in the image. As described above, depending on embodiment, operations 84 may also be performed before operation 83.

The predicted values of the colors of the pixel may further be subtracted from the actual values of the colors of the pixel so as to obtain differences between the actual values and the predicted values of the pixel, in operation 85.

Differences between the actual values and the predicted values of the pixel may be encoded and a bit stream including the encoding result generated, in operation 86.

Such an encoding result obtained in operation 86 may be decoded to recover the differences between the actual values and the predicted values of the pixel and the recovered differences may be added to recovered values of colors of a reference pixel corresponding to the pixel so as to generate recovered values of the colors of the pixel, in operation 87. In one or more embodiments, the pixel recovered in operation 87 may be used as a reference pixel for subsequent pixels that will be processed after the pixel.

Figure 9:
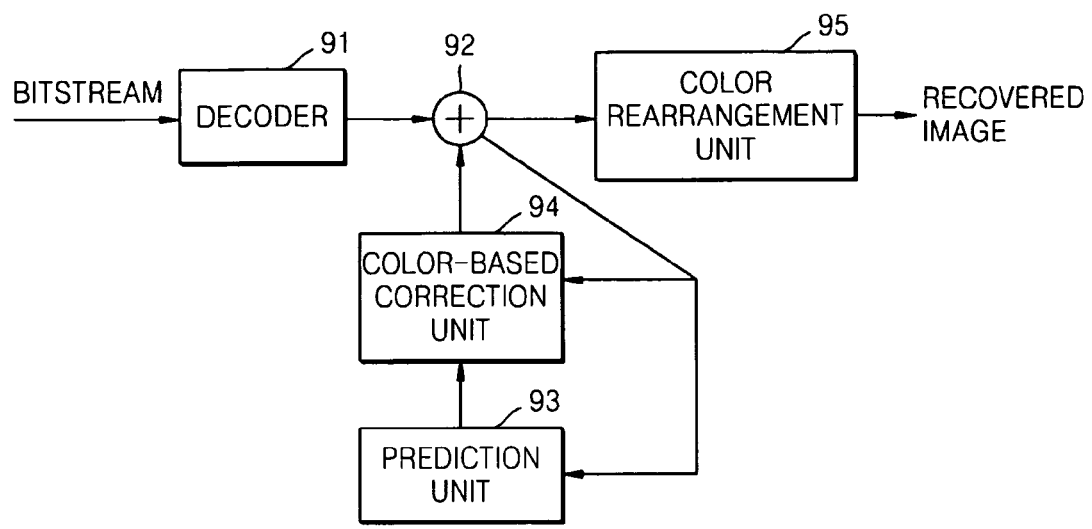
FIG. 9 illustrates an image recovering system, according to an embodiment of the present invention.

FIG. 9 illustrates an image recovering system, according to an embodiment of the present invention. Referring to FIG. 9, the image recovering system may include a decoder 91, a summer 92, a prediction unit 93, a color-based correction unit 94, and a color rearrangement unit 95. Since an image compressing operation and an image recovering operation can be symmetrical, according to one or more embodiments, components of the image recovering system of FIG. 9 may be similar to those of the image compressing system illustrated in FIG. 3.

The decoder 91 may decode data included within a received bit stream, such as a bit stream transmitted from the image compressing system illustrated in FIG. 3, to recover differences between actual values and predicted values of colors of a pixel from among pixels making up an image. The decoder 91 may use decoding techniques corresponding to the encoding techniques performed by the corresponding image compressing system that generated or stored the bit stream, for example, entropy decoding which is one of lossless compression methods, inverse quantization which is one of lossy compression methods, and inverse discrete cosine transform (IDCT), noting that alternatives are also available.

The prediction unit 93 may predict values of the colors of a pixel from values of colors of a reference pixel corresponding to the pixel from among pixels making up an image, as recovered by the summer 92.

The color-based correction unit 94 may correct the predicted values of the colors of the pixel, e.g., as generated by the prediction unit 93, based on similarities in variations in color values of pixels in the image. Specifically, the color-based correction unit 94 may correct predicted values of colors other than a normative color from among the colors of the pixel based on a difference between the actual value and the predicted value of the normative color. The color-based correction unit 94 may further have a similar configuration as that of the color-based correction unit illustrated in FIG. 4, for example, with further detailed explanation thereof being omitted.

The summer 92 may sum up differences between the actual values and the predicted values of the colors of the pixel, e.g., as recovered by the decoder 91, and the predicted values of the colors of the pixel, e.g., as corrected by the color-based correction unit 94, to generate the recovered values of the colors of the pixel. As described above, in an embodiment, since predicted values of only red and blue colors may be corrected and a predicted value of a green color corresponding to a normative color may not be corrected, the summer 92 may sum up the differences between the actual values and the predicted values of the colors of the pixel and the predicted values corrected by the color-based correction unit 36 for the red and blue colors and sum up the differences and the predicted values generated by the prediction unit 93 for the green color.

Furthermore, in an embodiment, the summer 92 may generate the recovered value of the normative color from among the colors of the pixel prior to the recovered values of other colors by one pixel. In such an embodiment, this can be performed because the color rearrangement unit 31 of the image compressing system illustrated in FIG. 3, for example, may have advanced forward the position of the normative color value by one pixel from the original position. Accordingly, in such an embodiment, an operation of returning the position of the normative color value to the original position may be required and the color rearrangement unit 95 may perform this operation, for example.

The color rearrangement unit 95 may move backward the position of the previously generated recovered value of the normative color from among colors of each of the pixels making up the image by one pixel from the position of a pixel to which the recovered value of the normative color currently belongs in terms of a pixel processing order. When such an image compressing system illustrated in FIG. 3, for example, does not include the color rearrangement unit 31, there may be no need to return the position of the normative color value to the original position so that the color rearrangement unit 95 may not be required.

Figure 10:
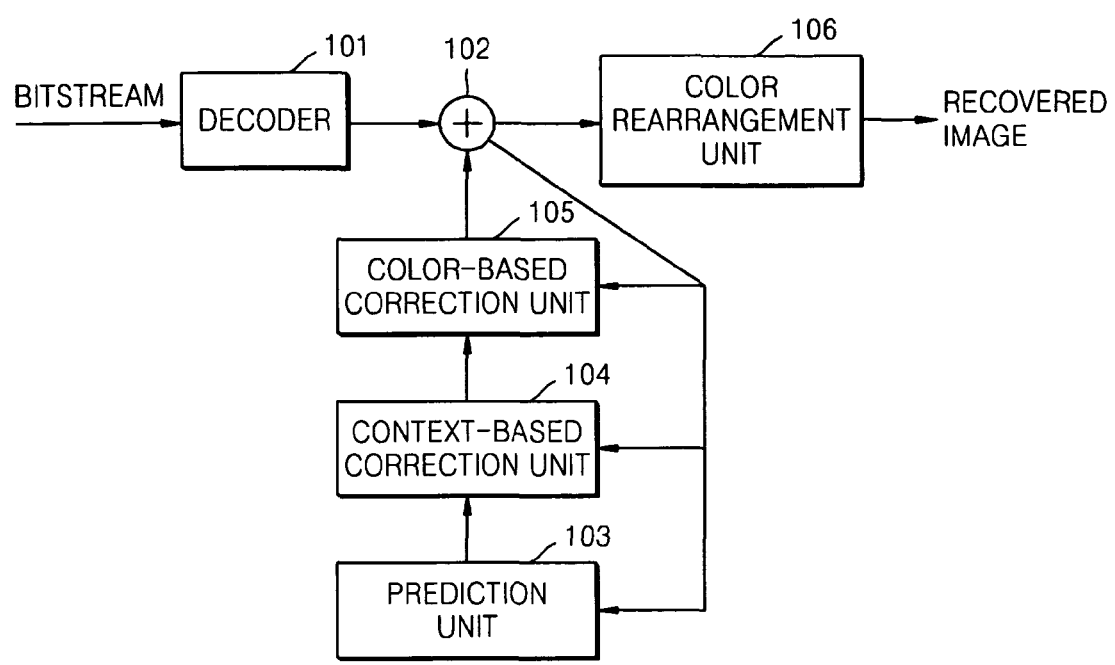
FIG. 10 illustrates an image recovering system, according to another embodiment of the present invention.

FIG. 10 illustrates an image recovering system, according to another embodiment of the present invention. Referring to FIG. 10, the image recovering system may include a decoder 101, a summer 102, a prediction unit 103, a context-based correction unit 104, a color-based correction unit 105, and a color rearrangement unit 106, for example. As above, an image compressing operation and an image recovering operation may be symmetrical, and thus components of the image compressing system, such as illustrated in FIG. 7, may be similar to those of the image recovering system illustrated in FIG. 10. Accordingly, in an embodiment, further description with respect to the image compressing system illustrated in FIG. 7 may be applied to the image recovering system illustrated in FIG. 10. Furthermore, components of the image recovering system illustrated in FIG. 10 may also be similar to those of the image recovering system illustrated in FIG. 9, for example, except for the context-based correction unit 104.

Accordingly, the context-based correction unit 104 may correct predicted values of colors of a pixel, generated by the prediction unit 103, based on errors of predicted values of colors of a pixel represented by a context identical or most similar to a context of the pixel from among previously accumulated contexts of a plurality of pixels in an image.

The color-based correction unit 105 may correct the predicted values, e.g., corrected by the context-based correction unit 104, based on similarities of variations in color values of pixels in the image. However, in an embodiment, it should be understood by those of ordinary skill in the art that the operation of the color-based correction unit 105 may also be performed and before the operation of the context-based correction unit 104. That is, in such an embodiment, the context-based correction unit 104 may correct the predicted values corrected by the color-based correction unit 105.

Figure 11:
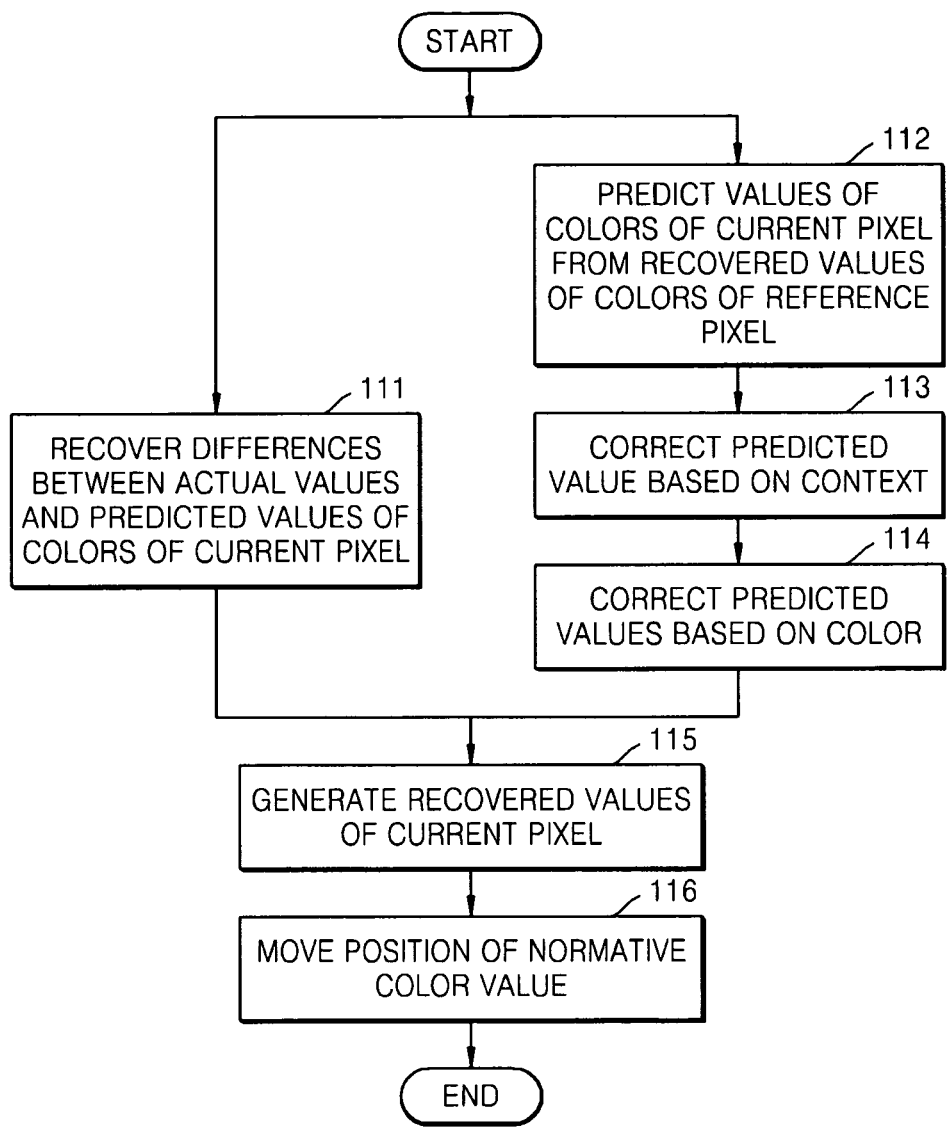
FIG. 11 illustrates an image recovering method, according to an embodiment of the present invention.

FIG. 11 illustrates an image recovering method, according to an embodiment of the present invention. As only one example, such an embodiment may correspond to example time-series operations of the example system illustrated in FIG. 9, but is not limited thereto and alternate embodiments are equally available.

Data included in a bit stream, e.g., transmitted from an image compressing system, such as illustrated in FIG. 3, may be decoded to recover differences between actual values and predicted values of colors of a pixel from among pixels making up an image, in operation 111.

Values of the colors of the pixel may be predicted from values of colors of a reference pixel corresponding to the pixel from among pixels making up a recovered image, in operation 112. Here, the recovered image can be an image made up of pixels processed and recovered by the image recovering method, according to the embodiment of the present invention, prior to the pixel.

The predicted values of the colors of the pixel may further be corrected based on errors of predicted values of colors of a pixel represented by a context identical or most similar to a context of the pixel from among previously accumulated contexts of a plurality of pixels in the image, in operation 113. As described above, depending on embodiment, such an operation 113 may be omitted.

The image recovering system illustrated in FIG. 9 corrects such predicted values, as corrected in operation 113, based on similarities in variations in color values of pixels in the image, in operation 114. Similarly, as described above, depending on embodiment, operation 114 may also be performed prior to operation 113.

Differences between the actual values and the predicted values of the pixel, recovered in operation 111, and the predicted values of the colors of a pixel may be summed so as to generate recovered values of the colors of the pixel, in operation 115. Such a pixel recovered in operation 115 may be used as a reference pixel for subsequent pixels that will be processed after the pixel.

The position of the previously generated recovered value of the normative color may be moved backward from among the colors of each of the pixels making up the image by one pixel from the position of a pixel to which the recovered value of the normative color currently belongs in terms of a pixel processing order, in operation 116. As described above, depending on embodiment, operation 116 may be omitted.

Figure 12:
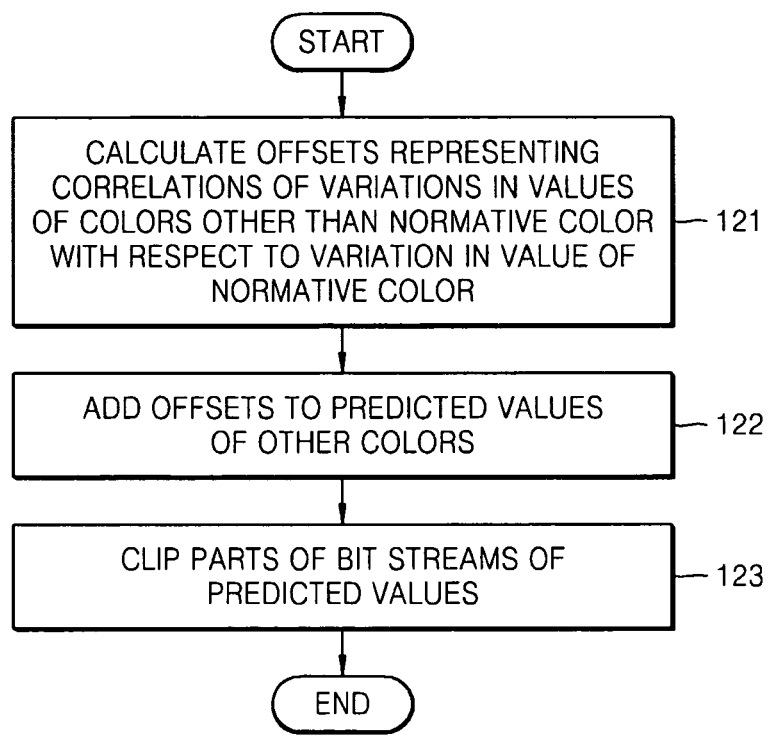
FIG. 12 illustrates a color-based predicted value correcting method, according to an embodiment of the present invention.

FIG. 12 illustrates a color-based predicted value correcting method, according to an embodiment of the present invention. As only one example, such an embodiment may correspond to example operations of the example system illustrated in FIG. 4, but is not limited thereto and alternate embodiments are equally available. For example, the method illustrated in FIG. 12 may correlate to operation 84 illustrated in FIG. 8 and operation 114 illustrated in FIG. 11.

Offsets representing correlations of variations in values of colors other than a normative color, from among the colors of a pixel, may be calculated with respect to a variation in a value of the normative color, in operation 121.

Such offsets may further be added to predicted values of the colors, other than the normative color, to correct the predicted values, in operation 122.

Parts of bit streams of the corrected predicted values may still further be clipped according to a bit stream length of pixels making up an image, in operation 123.

According to one or more of the above embodiments, predicted values of colors of pixels making up an image can be corrected based on similarities in variations in color values so as to predict values of the pixels such that the predicted values approximate actual values of the pixels. Accordingly, differences between the actual values and the predicted values of the pixels making up the image, that is, errors of the predicted values of the pixels, may approximate zero, thereby improving image compression rates.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A method adjusting predicted values for an input pixel for image compression, the method comprising:
   predicting values of colors for the pixel for compressing the pixel, from among pixels making up an image for the image compression, based on values of colors of a reference pixel corresponding to the pixel; and
   selectively modifying the predicted values of the colors for the pixel based on similarities in variations between values of colors in the image,
   wherein the selective modifying of the predicted values comprises modifying predicted values of colors other than a normative color within the colors represented by the predicted values, based on correlation of variations in the values of the colors other than the normative color with respect to a variation in the value of the normative color.

2. At least one non-transitory computer readable recording medium comprising computer readable code to control at least one processing element to implement of the method of claim 1.

3. A method adjusting predicted values for an input pixel for image compression, the method comprising:
   predicting values of colors for the pixel for compressing the pixel, from among pixels making up an image for the image compression, based on values of colors of a reference pixel corresponding to the pixel; and
   selectively modifying the predicted values of the colors for the pixel based on similarities in variations between values of colors in the image,
   wherein the selective modifying of the predicted values comprises modifying predicted values of colors other than a normative color within the colors represented by the predicted values, based on a difference between an actual value of the normative color of the pixel and a predicted value of the normative color for the pixel.

4. A method adjusting predicted values for an input pixel for image compression, the method comprising:
   predicting values of colors for the pixel for compressing the pixel, from among pixels making up an image for the image compression, based on values of colors of a reference pixel corresponding to the pixel; and
   selectively modifying the predicted values of the colors for the pixel based on similarities in variations between values of colors in the image, wherein the modifying of the predicted values comprises:
   calculating offsets representing correlations of variations in predicted values of colors other than a normative color within the colors represented by the predicted values, with respect to a value of the normative color; and
   summing the calculated offsets with the predicted values of the other colors to selectively modify the predicted values of the other colors.

5. The method of claim 4, wherein the calculating of the offsets comprises calculating an offset of each of the other colors by reflecting differences between the value of the normative color and the predicted values of the other colors in the difference between an actual value of the normative color of the pixel and a predicted value of the normative color for the pixel.

6. The method of claim 4, further comprising clipping portions of bit streams containing the modified predicted values.

7. The method of claim 6, wherein the bit streams contain the modified predicted values for the other colors and non-modified predicted values for the normative color for the pixel.

8. A system, including at least one processing device, modifying a predicted value for an input pixel for image compression, the system comprising:
   a prediction unit, using the at least one processing device, predicting values of colors for the pixel for compressing the pixel, from among pixels making up an image for the image compression, based on values of colors of a reference pixel corresponding to the pixel; and
   a correction unit to modify the predicted values of the colors for the pixel based on similarities in variations between values of colors in the image,
   wherein the selective modifying of the predicted values comprises modifying predicted values of colors other than a normative color within the colors represented by the predicted values, based on correlation of variations in the values of the colors other than the normative color with respect to a variation in the value of the normative color.

9. An image compressing method, comprising:
   predicting values of colors for compressing a pixel, from among pixels making up an image, based on values of colors of a reference pixel corresponding to the pixel;
   modifying the predicted values of the colors for the pixel based on similarities between different colors in variations between values of colors in the image;
   generating differences between input values of colors of the pixel and the modified predicted values for the colors of the pixel; and
   encoding the generated differences,
   wherein the selective modifying of the predicted values comprises modifying predicted values of colors other than a normative color within the colors represented by the predicted values, based on correlation of variations in the values of the colors other than the normative color with respect to a variation in the value of the normative color.

10. The image compressing method of claim 9, wherein the selective modifying of the predicted values comprises modifying predicted values of colors other than a normative color within the colors represented by the predicted values based on a difference between an actual value of the normative color of the pixel and a predicted value of the normative color for the pixel.

11. The image compressing method of claim 9, wherein the selective modifying of the predicted values of the colors further comprises selectively modifying the predicted values based on errors of the predicted values of the colors, respectively, with the errors being represented by a context corresponding to a context of the pixel from among previously accumulated contexts of a plurality of pixels in the image.

12. At least one non-transitory computer readable recording medium comprising computer readable code to control at least one processing element to implement the method of claim 9.

13. An image compressing method, comprising:
predicting values of colors for compressing a pixel, from among pixels making up an image, based on values of colors of a reference pixel corresponding to the pixel;
selectively modifying the predicted values of the colors for the pixel based on similarities in variations between values of colors in the image;
generating differences between input values of colors of the pixel and the selectively modified predicted values for the colors of the pixel;
encoding the generated differences; and
generating a recovered value of a normative color within the colors represented by the predicted values and used in the selective modifying of the predicted values, prior to recovering values of other colors, within the colors represented by the predicted values other than the normative color, from the encoding result.

14. The image compressing method of claim 13, further comprising advancing pixel locations by advancing a position, within the encoded result, of the value of the normative color for each pixel of the image by one pixel position from a position of a pixel to which the value of the normative color currently belongs, with the generating of the recovered value of the normative color comprising generating the recovered value of the normative color prior to the recovering of the values of the other colors based on the advancement of the position of the value of the normative color.

15. An image recovering method, comprising:
recovering from compressed image data differences between actual values of colors of a pixel and predicted values of the colors for the pixel, from among pixels making up a corresponding image;
predicting values of the colors of the pixel based on values of colors of a reference pixel corresponding to the pixel;
selectively modifying the predicted values of the colors for the pixel based on similarities in variations between values of colors in the image; and
summing the recovered differences with the selectively modified predicted values and generating recovered values of the colors of the pixel based on a result of the summing,
wherein the selective modifying of the predicted values comprises modifying predicted values of colors other than a normative color within the colors represented by the predicted values, based on correlation of variations in the values of the colors other than the normative color with respect to a variation in the value of the normative color.

16. The image recovering method of claim 15, wherein the modifying of the predicted values comprises modifying predicted values of the colors other than a normative color within the colors represented by the predicted values based on a difference between an actual value of the normative color of the pixel and a predicted value of the normative color for the pixel.

17. The image recovering method of claim 15, wherein the generating of the recovered values comprises generating a recovered value of a normative color, within the colors represented by the predicted values, prior to recovered values of the colors other than the normative color and within the colors represented by the predicted values.

18. The image recovering method of claim 15, further comprising correcting the predicted values of the colors of the pixel based on errors of the predicted values of the colors, respectively, the errors being represented by a context corresponding to a context of the pixel from among previously accumulated contexts of a plurality of pixels in the image.

19. At least one non-transitory computer readable recording medium comprising computer readable code to control at least one processing element to implement the method of claim 15.

20. An image recovering method, comprising:
recovering from compressed image data differences between actual values of colors of a pixel and predicted values of the colors for the pixel, from among pixels making up a corresponding image;
predicting values of the colors of the pixel based on values of colors of a reference pixel corresponding to the pixel;
selectively modifying the predicted values of the colors for the pixel based on similarities in variations between values of colors in the image;
summing the recovered differences with the selectively modified predicted values and generating recovered values of the colors of the pixel based on a result of the summing, with the generating of the recovered values including generating a recovered value of a normative color, within the colors represented by the predicted values, prior to recovered values of the colors other than the normative color and within the colors represented by the predicted values; and
moving backward a position of a previously recovered value of the normative color by one pixel position from the position of a pixel to which the recovered value of the normative color currently belongs.

21. A compression system, including at least one processing device, comprising:
a correction unit to selectively color modify predicted values for input image data based on similarities in variations between values of colors in the image data; and
an encoder, using the at least one processing device, to encode a difference between the input image data and predicted image data for respective normative color image data and a difference between the input image data and the modified predicted values for respective non-normative color image data, with at least one pixel of the input image data having a non-zero normative color value and a non-zero non-normative color value.

22. The compression system of claim 21, wherein the encoder respectively encodes a difference between normative color data of the at least one pixel and corresponding predicted image data at different pixel data positions within a generated bit stream other than a difference between non-normative color data of the at least one pixel and the modified predicted values.

23. An image recovering system, including at least one processing device, comprising:
a recovering unit, using the at least one processing device, to recover encoded differences between an original input image data and corresponding predicted image data used in compressing the input image; and a correction unit to selectively color modify predicted values, from predicted values derived for all colors of the image data to recover the input image, for non-normative color image data for the image data based on similarities in variations between values of colors in the image data, wherein the corresponding predicted image data used in the compressing of the input image includes non color-modified predicted image data used in the compressing of the input image for respective normative color image data and color-modified predicted data used in the compressing of the input image for respective non-normative color image data, with at least one pixel of the input image data having a non-zero normative color value and a non-zero non-normative color value.

24. The image recovering system of claim 23, further comprising:

a summing unit to sum first respective recovered differences with predicted values for the normative color image data, from the predicted values derived for all colors of the image data, and sum second respective recovered differences with the modified predicted values for non-normative color image data to recover the original input image.

25. A compression system including at least one processing device, comprising:

a context-based correction unit, using the at least one processing device, to perform context-based modification of predicted values of input image data to generate context corrected predicted values for the input image;

a correction unit to selectively color modify the context corrected predicted values for the input image data based on similarities in variations between values of colors in the image data to generate color modified predicted values; and an encoder to encode a difference between the input image data and the context corrected predicted values for respective normative color image data and a difference between the input image data and the color modified predicted values for respective non-normative color image data, with at least one pixel of the input image data having a non-zero normative color value and a non-zero non-normative color value.

26. A compression system, including at least one processing device, comprising:

a correction unit to selectively color modify predicted values for input image data based on similarities in variations between values of colors in the image data to generate color modified predicted values;

a context-based correction unit, using the at least one processing device, to perform context-based modification of the color modified predicted values for non-normative color image data for the input image data and context-based modification of the predicted values for respective normative color image data, with at least one pixel of the input image data having a non-zero normative color value and a non-zero non-normative color value, to generate context corrected predicted values for the input image; and an encoder to encode a difference between the input image data and the context corrected predicted values for respective normative color image data and non-normative color image data.

27. A compression method, comprising:

selectively color modifying predicted values for input image data based on similarities in variations between values of colors in the image data; and encoding a difference between the input image data and predicted image data for respective normative color image data and a difference between the input image data and the modified predicted values for respective non-normative color image data, with at least one pixel of the input image data having a non-zero normative color value and a non-zero non-normative color value.

28. The compression method of claim 27, wherein the encoding further comprises respectively encoding a difference between normative color data of the at least one pixel and corresponding predicted image data at different pixel data positions within a generated bit stream other than a difference between non-normative color data of the at least one pixel and the modified predicted values.

29. An image recovering method, comprising:

recovering encoded differences between an original input image data and corresponding predicted image data used in compressing the input image; and selectively color modifying predicted values, from predicted values derived for all colors of the image data to recover the input image, for non-normative color image data for the image data based on similarities in variations between values of colors in the image data, wherein the corresponding predicted image data used in the compressing of the input image includes non-color modified predicted image data used in the compressing of the input image for respective normative color image data and color-modified predicted data used in the compressing of the input image for respective non-normative color image data, with at least one pixel of the input image data having a non-zero normative color value and a non-zero non-normative color value.

30. The image recovering method of claim 29, further comprising:

summing respective first recovered differences with predicted values for the normative color image data, from the predicted values derived for all colors of the image data, and second respective recovered differences with the modified predicted values for non-normative color image data to recover the original input image.

31. A compression method, comprising:

context-based modifying predicted values of input image data to generate context corrected predicted values for the input image;

selectively color modifying the context corrected predicted values for the input image data based on similarities in variations between values of colors in the image data to generate color modified predicted values; and encoding a difference between the input image data and the context corrected predicted values for respective normative color image data and a difference between the input image data and the color modified predicted values for respective non-normative color image data, with at least one pixel of the input image data having a non-zero normative color value and a non-zero non-normative color value.

32. A compression method, comprising:

selectively color modifying predicted values for input image data based on similarities in variations between values of colors in the image data to generate color modified predicted values;

context-based modifying the color modified predicted values for non-normative color image data for the input image data and context-based modifying the predicted values for respective normative color image data, with at least one pixel of the input image data having a non-zero normative color value and a non-zero non-normative color value, to generate context corrected predicted values for the input image; and encoding a difference between the input image data and the context corrected predicted values for respective normative color image data and non-normative color image data.

* * * * *

UNITED STATES PATENT AND TRADEMARK OFFICE
CERTIFICATE OF CORRECTION

PATENT NO.         : 8,447,104 B2
APPLICATION NO.    : 12/076549
DATED              : May 21, 2013
INVENTOR(S)        : Sang-jo Lee et al.

It is certified that error appears in the above-identified patent and that said Letters Patent is hereby corrected as shown below:

In the Claims:

Col. 15, Line 45, In Claim 2, after "implement" delete "of".

Signed and Sealed this
Eighth Day of October, 2013

Teresa Stanek Rea
*Deputy Director of the United States Patent and Trademark Office*